G. A. PARMENTER.
LIFE GUARD FOR RAILWAY CARS.
APPLICATION FILED SEPT. 26, 1910.
985,542.
Patented Feb. 28, 1911.
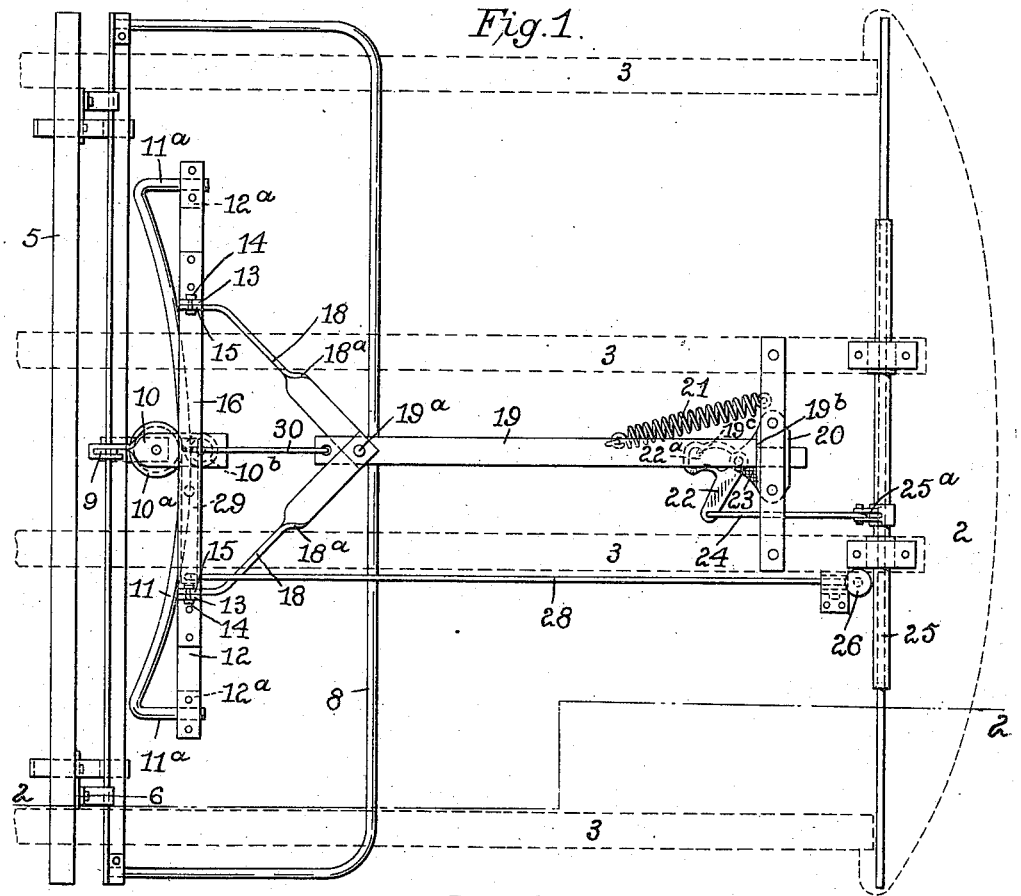
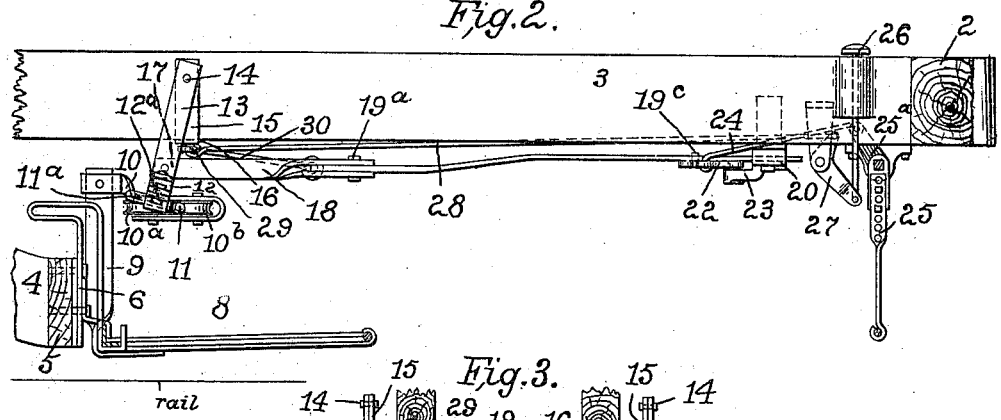
Attest:
Ewd L. Tolson
Bent. W. Stahl
Inventor:
George A. Parmenter,
by Spear Middleton Donaldson & Spear
Attys.

UNITED STATES PATENT OFFICE.

GEORGE A. PARMENTER, OF CAMBRIDGE, MASSACHUSETTS.

LIFE-GUARD FOR RAILWAY-CARS.

985,542.        Specification of Letters Patent.       Patented Feb. 28, 1911.

Application filed September 26, 1910. Serial No. 583,975.

*To all whom it may concern:*

Be it known that I, GEORGE A. PARMENTER, citizen of the United States, residing at Cambridge, Massachusetts, have invented certain new and useful Improvements in Life-Guards for Railway-Cars, of which the following is a specification.

My present invention relates to improvements in fenders or life guards for street railway cars of the type known as trip and drop scoop, and particularly to those in which the pick up scoop or basket is carried by the swinging bogie or truck while the trip device is carried by the car body.

The invention has among others for its objects to simplify the construction and reduce the cost, to render more easy the application of the device to the car, and to make it more easy and certain in action.

The invention includes the novel features of construction and arrangement and combination of parts as defined in the appended claims.

An embodiment of my invention is illustrated in the accompanying drawings, in which—

Figure 1 is a plan view of the fender or wheel guard with the sills of a car and the pilot board of the truck thereof shown to illustrate the manner of mounting the wheel guard upon a car; Fig. 2 is a section on line 2—2 of Fig. 1 with the trip frame shown in elevation, and Fig. 3 is a detail view.

Referring by reference characters to this drawing, the numeral 2 is intended to designate the car platform, and 3 the sills. A portion of the swiveled truck frame is indicated at 4, having the usual front cross bar or pilot board 5 to which are secured hangers 6, which may be of the construction shown, and may pivotally and resiliently support the basket or scoop 8, in the manner disclosed in a companion application filed by me on the 30th day of August, 1910, Serial No. 579,665, further description thereof herein being deemed unnecessary, or may be made rigid if desired.

Centrally of the basket or scoop and at the rear edge thereof is located a vertical arm 9, through which the scoop is normally held elevated and dropped when desired in the manner and by the means which will now be described.

To the upper end of the bar 9 is pivotally connected the rear end of a sheave-carrying bracket 10 which is provided at its opposite end with pulleys or sheaves or other anti-friction devices, as indicated at 10$^a$ and 10$^b$, which embrace between them a curved or "radial" bar 11 which is curved on the arc of a circle which has for its center the pivotal axis of the truck. This bar has angularly turned ends 11$^a$ which are firmly secured by suitable holding clips or devices 12$^a$ to the ends of a transverse bar 12. This bar is supported by L-shaped hangers 13 pivotally connected at their upper ends with the car body in any suitable manner, as, for instance, by securing them by means of pivot or hinge bolts 14 to the angularly turned ends 15 of a cross bar 16 secured to the sills of the car.

To the L-shaped hangers 13 are pivotally connected the rear ends 17 of links or bars 18 which converge toward each other and are preferably constructed of bar iron or steel and given a quarter turn as indicated at 18$^a$ so that their forward ends lie in parallel horizontal planes. Between these ends, which are arranged overlapping, is located the rear end of a longitudinally disposed locking bar 19, the three members being secured together by a bolt or pin 19$^a$. This locking bar 19 has its forward end slidingly supported in a suitable guide or hanger 20 depending from the car platform.

The locking bar has a laterally extending shoulder or offset 19$^b$ which is designed to rest behind and engage a coacting shoulder formed preferably by the edge of the guide or hanger so that when the parts are in the position indicated in Fig. 1, the locking bar will be held in its rearward position, and will, through the connections hereinbefore described, hold the basket or scoop elevated. In order to hold the bar 19 with its shoulder in locking engagement with the guide or hanger, I provide a spring 21 which has one end connected with the bar and its other end to the guide or hanger 20 or its support, the spring lying in a diagonal position so that it not only tends to swing the bar 19 laterally, to bring and hold its shoulder into locking engagement with the shoulder of the guide or hanger, but also, when the front end of the bar is moved laterally, to disengage said shoulders, and tends to draw the bar forwardly, and thus assisting the action of gravity in causing the scoop to drop quickly.

In order to impart a lateral motion to the bar to thus unlock or release it, a bell crank lever 22 is pivoted on a bracket arm 23, one arm of this bell crank lever being connected by a link or rod 24 with an upwardly extending arm 25ª carried by the top bar of the swinging trip frame 25. The other arm of the bell crank lever 22 is provided with an elongated slot 22ª which is engaged by a pin or projection 19° on the bar 19. Normally, the pin lies near the rear end of the slot, and when the trip frame is swung rearwardly the pull upon the link will rock the bell crank lever and cause the slotted arm to swing transversely of the car, and, through the pin connection, pull the bar 19 sufficiently to one side to disengage the locking shoulder.

The slot in the arm of the bell crank is made of sufficient length to allow full forward movement to the bar to drop the scoop or basket. The slot is made of such a width as will permit the trip frame to be swung forward without binding on the pin.

For the purpose of resetting the scoop or basket, I provide a depressible treadle 26 in convenient reach of the motorman, the lower end of which treadle is connected to one arm of a bell crank lever 27, the other arm of which is connected by a rod or its equivalent 28 connected at its rear end to one end of a rocking lever 29 pivoted to the cross bar 16 and having its other end connected by a link 30 with the rear end of the locking bar.

When the scoop has been dropped and is to be reset, the depression of the treadle will pull upon the rod 28, rocking the lever 29 and through link 30 drawing the bar 19 back, thus restoring the parts to normal position.

Should it be desired to locate the locking bar to one side of the center of the car, this may be readily accomplished by making one of the links 18 slightly longer than the other, thus allowing the bar 19 and the parts at the front end to be located sufficiently to one side to clear the draw bar.

Having thus described my invention what I claim is:—

1. The combination with a car body and swiveled truck frame, of a drop scoop carried by the truck frame, a curved bar extending transversely of the car body and supported therefrom, and capable of being bodily moved in a direction longitudinal of the car, means effecting a sliding connection between the scoop and curved bar, a longitudinally movable locking bar, a pair of diverging links affording connection between said curved bar and said locking bar, and tripping means for said locking bar.

2. The combination with a car body and swiveled truck frame, of a drop scoop carried by the truck frame, a curved bar extending transversely of the car body and supported therefrom and capable of being bodily moved in a direction longitudinal of the car, means effecting a sliding connection between the scoop and curved bar, a pair of forwardly converging links having their rear ends in operative connection with said curved bar, a longitudinally movable locking bar having its rear end pivotally connected with said links, and locking and releasing means for said locking bar.

3. In a car fender or wheel guard, a drop scoop, a longitudinally movable locking bar, a pair of links pivotally connected at their front ends with said locking bar and diverging rearwardly and operatively connected with said scoop at their rear ends, and locking and releasing means for said locking bar.

4. In a car fender or wheel guard, a drop scoop, a longitudinally movable locking bar, a pair of links pivotally connected at their front ends with said locking bar by a vertical pivot pin and diverging rearwardly and operatively connected with said scoop at their rear ends, and means for effecting lateral movement of the front end of said locking bar for locking and releasing the same.

5. The combination with a car body and swiveled truck frame, of a drop scoop carried by the truck frame, a pair of pivoted hangers depending from the body of the car, a curved bar supported from said hangers and having sliding engagement with a part carried by the scoop, a pair of links connected at their rear ends with said hangers by horizontally disposed pivots, said bars converging to a meeting point at their forward ends, a longitudinally movable locking bar connected to said links at its rear end by a vertical pivot, and locking and releasing means for said bar.

6. The combination with a car body and swiveled truck frame, of a drop scoop carried by the truck frame, a pair of pivoted hangers depending from the body of the car, a cross bar supported by said hangers, a curved bar having its ends connected with the ends of said cross bar and having sliding engagement with a part carried by the scoop, a pair of bar links connected to said hangers by horizontal pivots, said bar links converging to a common meeting point and each being given a quarter twist to bring their overlapping ends in horizontal planes, a longitudinal locking bar having its rear end connected to said overlapping ends by a vertical pivot, and locking and releasing means for said locking bar operating through lateral swinging movements imparted to the front portion of the bar.

7. In a car fender or wheel guard, a drop scoop, a longitudinally movable locking bar, a pair of links pivotally connected at their front ends with said locking bar and diverging rearwardly and operatively connected with said scoop at their rear ends, locking and releasing means for said locking bar, and resetting means connected with said longitudinally movable bar and operable from the car platform.

8. In a car fender or wheel guard, a drop scoop, a longitudinally movable locking bar, a pair of links pivotally connected at their front ends and diverging rearwardly and operatively connected with said scoop at their rear ends, locking and releasing means for said bar, a rocking lever supported from the car platform and having one end linked to the rear end of said bar, and a resetting device connected with the opposite end of said lever.

In testimony whereof, I affix my signature in presence of two witnesses.

GEORGE A. PARMENTER.

Witnesses:
MILDRED E. PARMENTER,
MARION A. PARMENTER.

Copies of this patent may be obtained for five cents each, by addressing the "Commissioner of Patents, Washington, D. C."